United States Patent

Olesen et al.

[11] 4,076,615
[45] Feb. 28, 1978

[54] PROCESS AND SYSTEM FOR TREATING WASTE WATER

[75] Inventors: Douglas E. Olesen, Kennewick; Alan J. Shuckrow, Pasco, both of Wash.

[73] Assignee: Battelle Pacific N. W. Laboratories, Richland, Wash.

[21] Appl. No.: 619,628

[22] Filed: Oct. 6, 1975

Related U.S. Application Data

[63] Continuation of Ser. No. 446,308, Feb. 27, 1974, abandoned.

[51] Int. Cl.$^2$ .............................................. C02C 5/04
[52] U.S. Cl. .......................................... 210/5; 210/6; 210/17; 210/18; 210/39; 210/45
[58] Field of Search ................... 210/4, 17, 18, 32, 39, 210/40, 54, 5–7, 45, 47, 52, 53

[56] References Cited

U.S. PATENT DOCUMENTS

| | | | |
|---|---|---|---|
| 3,244,621 | 4/1966 | Bouthilet | 210/39 |
| 3,442,798 | 5/1969 | Schoeffel et al. | 210/40 |
| 3,480,144 | 11/1969 | Barth et al. | 210/4 |
| 3,516,932 | 6/1970 | Hedrick et al. | 210/54 |
| 3,673,083 | 6/1972 | Sawyer et al. | 210/18 |
| 3,728,253 | 4/1973 | Kaufman | 210/18 |
| 3,767,570 | 10/1973 | Clapp | 210/40 |
| 3,803,029 | 4/1974 | Blecharczyk | 210/17 |
| 3,876,536 | 4/1975 | Prodt et al. | 210/18 |
| 3,904,518 | 9/1975 | Hutton et al. | 210/18 |

*Primary Examiner*—Thomas G. Wyse
*Attorney, Agent, or Firm*—Seed, Berry, Vernon & Baynham

[57] ABSTRACT

A process of treating raw or primary waste water using a powdered, activated carbon/aerated biological treatment system is disclosed. Effluent turbidities less than 2 JTU (Jackson turbidity units), zero TOC (total organic carbon) and in the range of 10 mg/l COD (chemical oxygen demand) can be obtained. An influent stream of raw or primary waste water is contacted with an acidified, powdered, activated carbon/alum mixture. Lime is then added to the slurry to raise the pH to about 7.0. A polyelectrolyte flocculant is added to the slurry followed by a flocculation period — then sedimentation and filtration. The separated solids (sludge) are aerated in a stabilization sludge basin and a portion thereof recycled to an aerated contact basin for mixing with the influent waste water stream prior to or after contact of the influent stream with the powdered, activated carbon/alum mixture.

7 Claims, 3 Drawing Figures

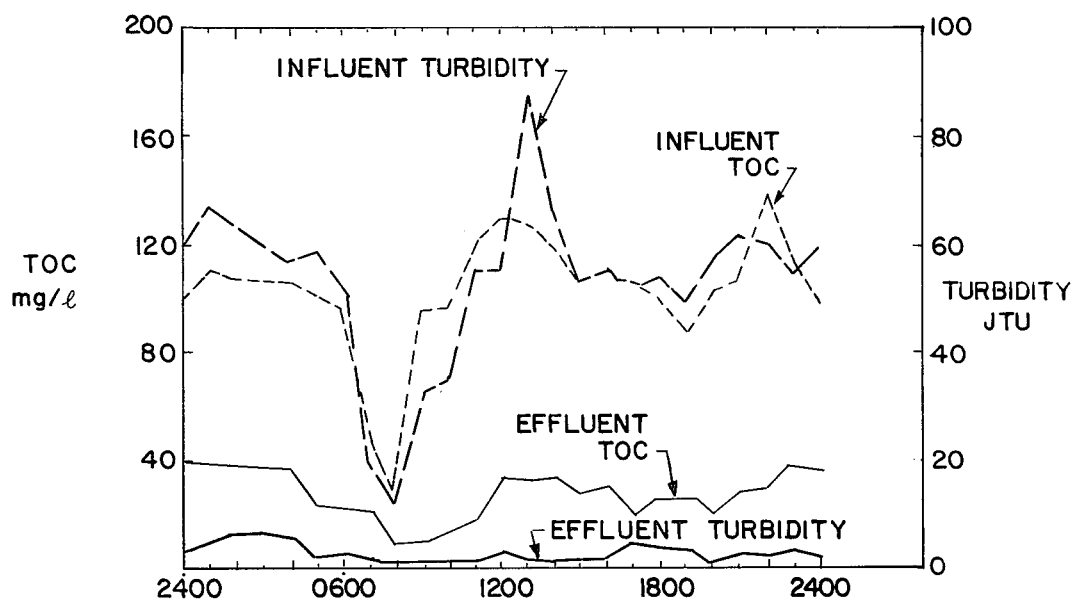
FIG. 2
FIG. 3
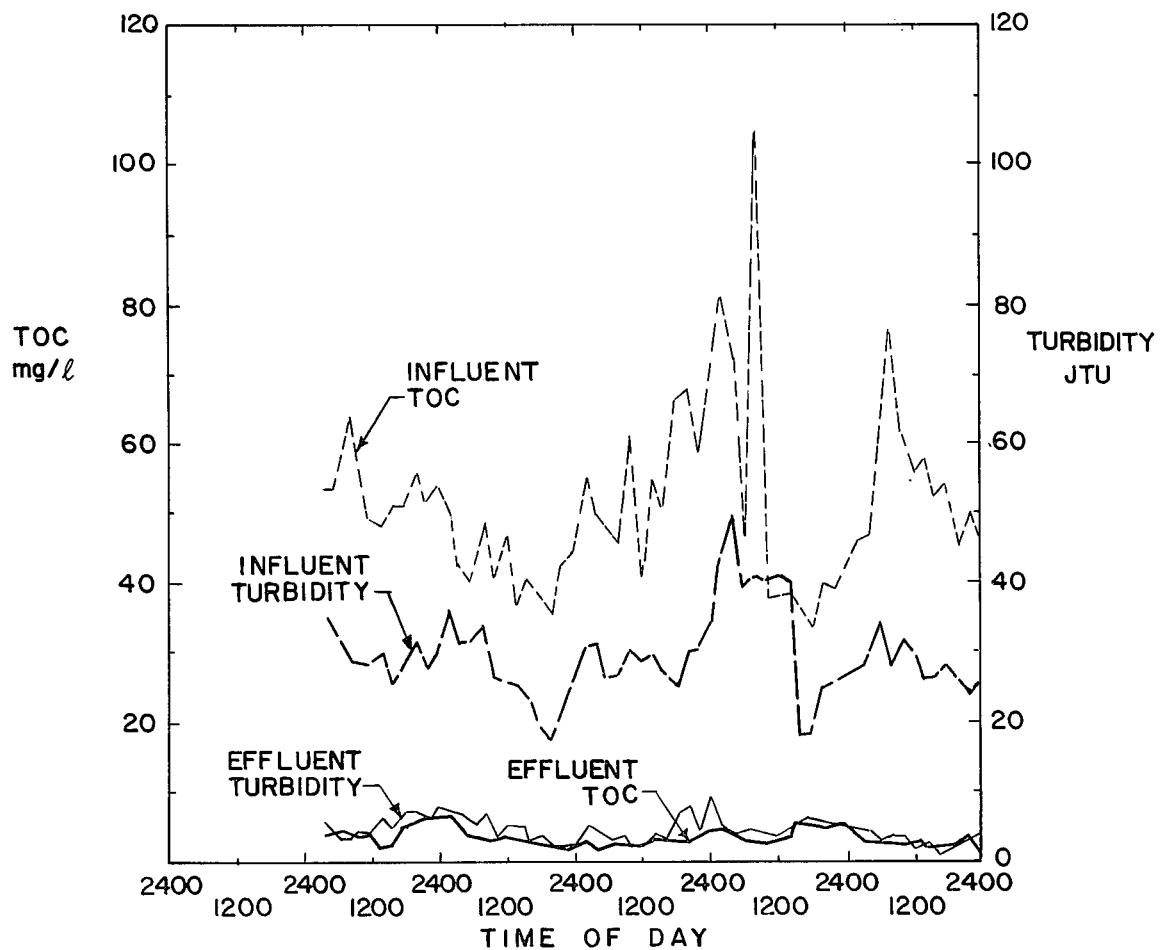

PROCESS AND SYSTEM FOR TREATING WASTE WATER

This is a continuation of application Ser. No. 446,308, filed Feb. 27, 1974 now abandoned.

BACKGROUND OF THE INVENTION

1. Field of the Invention

This invention relates to a waste water treatment system for removal of suspended and dissolved organic materials contained therein.

2. Prior Art Relating to the Disclosure

An extensive review of waste water treatment processes is disclosed in the dissertation of one of the applicants entitled "Powdered Carbon Treatment of Municipal Waste Water," submitted in partial fulfillment of the requirements for the degree of Doctor of Philosophy, University of Washington, available to the public sometime in March, 1973. The dissertation includes disclosure and experimental data of the process and system claimed herein. The discussion of the prior art following is based on material found in the dissertation.

Municipal waste water treatment normally has one or more of the following objectives: (1) suspended solids removal, (2) dissolved organic removal, (3) nutrient removal, (4) dissolved solids removal, (5) removal or destruction of pathogenic organisms, and (6) ultimate sludge disposal. These objectives have generally been achieved by various combinations of individual unit processes. Recent process developments for waste water treatment have followed two basic approaches: (1) use of conventional secondary biological treatment followed by or combined with physical/chemical unit processes, or (2) use of only physical/chemical unit process combinations.

Processes for organic removal from water water streams which have been studied or utilized include combinations of physical/chemical unit processes involving chemical clarification/filtration followed by granular-activated carbon adsorption. More recently, powdered, activated carbon systems involving carbon/waste water slurry contact have been utilized. Although these processes have been effective, there is generally a residual organic content remaining in the treated water which must be effectively removed or treated, particularly if the water is to be reused.

SUMMARY OF THE INVENTION

It is a primary object of this invention to provide an improved process and system for the treatment of raw or primary waste water using a combination powdered, activated carbon/aerated biological treatment process. Another object of this invention is to provide a process and system for removal of what is generally designated a "nonsorbable fraction of organic material" from raw or primary waste water.

Although a limited amount of work has been carried out on the addition of powdered, activated carbon to conventional activated sludge systems, no work, to Applicant's knowledge has focused on combined, short detention time, powdered, activated carbon/aerated biological treatment systems.

The process comprises (1) contacting the influent waste water stream with a slurry containing powdered, activated carbon for adsorption of the organic material thereon, (2) effecting solid-liquid separation, (3) discharging an oxygen-containing gas stream through the separated solids, and (4) recycling a portion of the aerated solids to an aerated contact basin through which the influent waste water stream is also directed.

BRIEF DESCRIPTION OF THE DRAWINGS

FIGS. 2 and 3 are graphs of total organic carbon (TOC) in mg/l and turbidity (JTU units) versus time for influent and effluent streams at the same treatment level comparing a powdered, activated carbon system with the system claimed, i.e., a powdered, activated carbon-/aerated biological treatment system.

DESCRIPTION OF THE PREFERRED EMBODIMENTS

Figure 1:
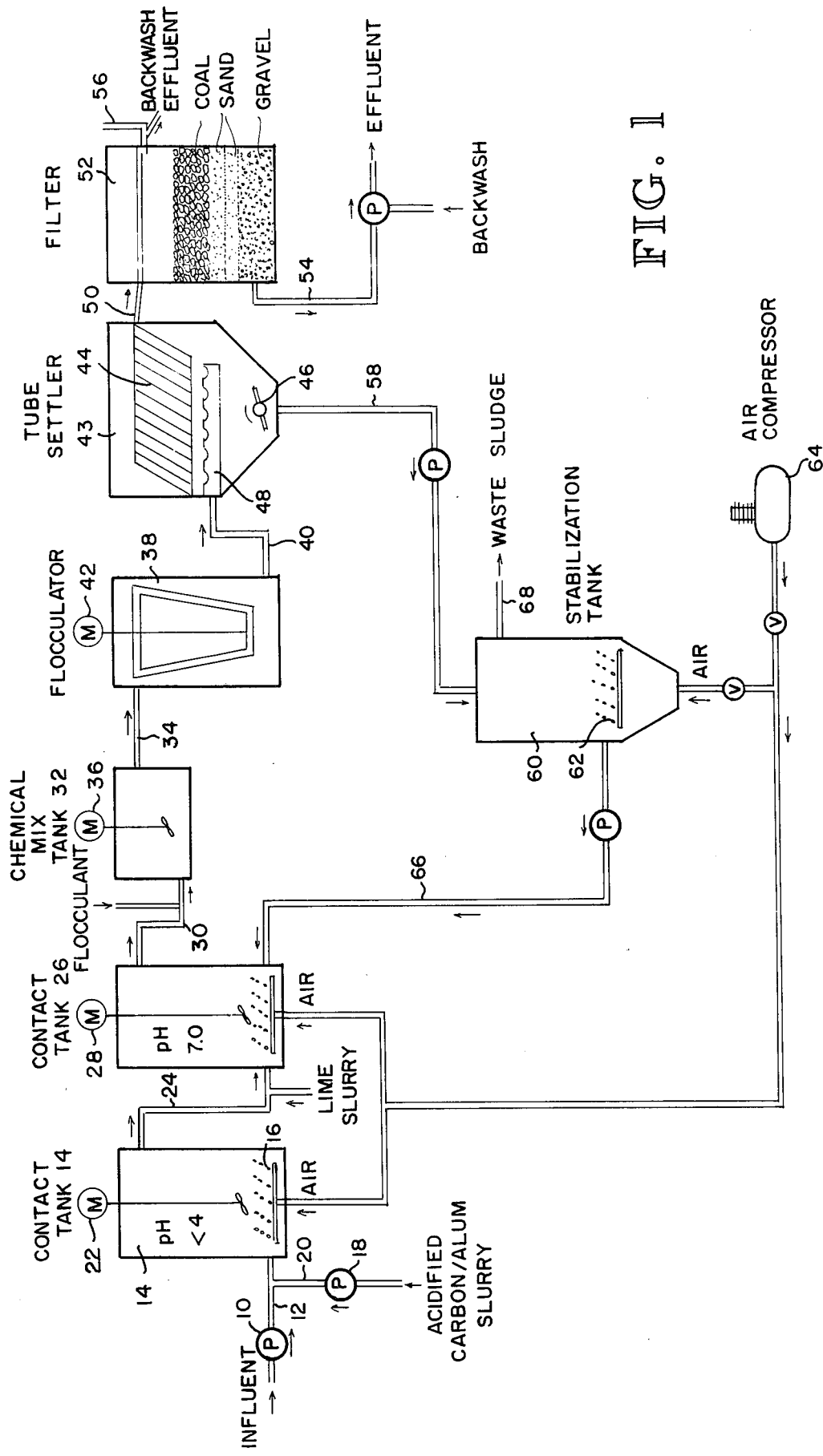
FIG. 1 is the flow diagram of one mode of operation of the process claimed.

FIG. 1 illustrates a plant flow diagram designed and fabricated for study to evaluate a powdered, activated carbon system and the system claimed herein, a powdered, activated carbon/aerated biological treatment system. Referring to FIG. 1, the waste water influent stream is pumped by pump 10 through line 12 leading into the lower end of the contact tank 14, a tank about 13½ inches in diameter, 24 inches high, having an air diffuser 16 in the tank bottom made up of 2 porous (60–70 micron) filter candles 24 × 160 millimeters. Prior to the influent stream entering tank 14, a powdered, activated carbon slurry is metered into the influent stream through line 20 by pump 18. The slurry may be powdered, activated carbon alone or in admixture with alum.

The powdered, activated carbon is of a mesh size less than 200 mesh added in sufficient amounts to the influent stream to give a concentration therein of at least 50 mg/l. The amount of powdered, activated carbon added generally ranges from 100–600 mg/l. The powdered carbon may be any of a number of commercially available materials, such as that sold under the tradename Aqua Nuchar A.

The alum ($Al_2SO_4 \cdot 18H_2O$) should generally be added to the influent stream in amounts ranging from 100–500 mg/l, preferably 150–300 mg/l. When the carbon/alum mixture is thermally regenerated from the waste sludge, it is generally acidified with sulfuric acid to a pH of 4 or less.

The activated carbon in tank 14 is rapidly mixed with the influent waste water by a single-blade stirrer 22. The average retention time of the slurry/waste water mixture in tank 14 may range from 5 to 30 minutes.

After suitable mixing, the mixture is pumped out of tank 14 through line 24 into a second contact tank 26, having a configuration similar to that of tank 14. Prior to entry of the mixture into tank 26, a lime slurry is pumped into line 24. The lime is added to adjust the pH of the slurry to about 7.0 and causes precipitation of the aluminum as aluminum hydroxide. Tank 26 is also an aerated contact tank and the aqueous mixture is rapidly mixed by stirrer 28 for an average retention timing ranging from 5 to 30 minutes. The mixture is then pumped out of tank 26 through line 30 into a chemical mix tank 32 having the inflow line entering near the bottom of the tank and an outflow line 36 leading from near the top of the tank. The mixture in the chemical mix tank is rapidly mixed with a single-blade stirrer 36.

A flocculant, suitably a polyelectrolyte, is pumped into the mixture entering the chemical mix tank through line 30. The polyelectrolyte may be any of a number of commercially available polyelectrolytes, such as the anionic polyacrylamides sold under the trademarks Atlasep 2A2, Magnifloc 836A, Nopcofloc 930 and Purifloc A-23. The amount of flocculant added to the stream should be sufficient to effectively flocculate the material. Generally, an amount ranging from 0.5 to 5 mg/l, based on the waste water stream, is suitable. The mixture is rapidly stirred in the chemical mix tank for an average retention time ranging from 1 to 10 minutes and the mixture then pumped through line 34 into a flocculator tank 38, 18¾ inches in diameter and 31 inches high, with the influent line near the top of the tank and the effluent line 40 near the bottom. The mixture in the tank is slowly stirred by a powered paddle 42, 13 inches wide at the top, 6 inches wide at the bottom, 17¾ inches high, mounted on a ¼ inch shaft, with the paddles being 1½ inches wide. After an average retention time of 10 to 60 minutes, the mixture is pumped from the flocculator tank into a tube settler 43, 12 inches × 18 inches, provided with a hopper bottom. A multiplicity of tubes 44, each 9 inches long, inclined 60° to the horizontal, and hexagonally shaped, are positioned in the tube settler. A paddle-stirrer 46 is provided in the hopper bottom. The influent stream entering through line 40 is directed through slotted distributors 48 with withdrawal through a trough 2¼ inches above the tubes, 4 inches wide (not shown). The tube settler is designed to effect solid-liquid separation of the flocculated material from the treated water stream. The clean supernatant liquid from the trough in the tube settler is withdrawn through line 50 into a multi-media filter 52 having a 12" × 12" surface area. The filter materials include a 4 inch coal layer, a 2 inch quartz sand layer, 3 inch granite sand layer and a 3 inch gravel layer. The treated water filters through the multi- media filter system and is discharged through line 54. At desired intervals, the filter can be backwashed and the backwash effluent discharge through line 56.

The sludge deposited in the hopper bottom of the tube settler is withdrawn through line 58, leading to an aerated sludge stabilization tank 60 provided with an air diffuser 62 of the same type as contact tanks 14 and 26. Air, or other oxygen-containing gas, is pumped through the diffuser plates in the sludge stabilization tank 60 and contact tanks 14 and 26 by an air compressor 64. A portion of the aerated sludge is withdrawn from sludge stabilization tank 60 through line 66 and recycled to mix with the influent waste water stream or the treated waste water stream after discharge from contact tank 14. The remainder of the sludge is discharged through line 68.

If desired, the waste sludge may be processed to recover the carbon/alum mixture by thermally treating the sludge to regenerate the activated carbon and alumina, followed by treatment of the activated carbon-/alumina mixture with sulfuric acid to obtain aluminum sulfate or alum.

A series of continuous pilot plant studies was conducted using the equipment and procedures described. The studies were designed to evaluate the residual organic (TOC) material and turbidity in the effluent under a variety of operating configurations and influent waste water qualities. The results reported involved continuous operation of th pilot plant shown in FIG. 1 in four basic modes. Mode A was operated as a conventional, powdered, activated carbon system such as described in the publications: Shuckrow, A. J., Dawson, G. W., and Olesen, D. E., "Treatment of Raw and Combined Sewage, Water and Sewer Works, " 118, 104–111 (April, 1971); and Shuckrow, A. J., Dawson, G. W., and Barr, W. F, "Pilot Plant Evaluation — A Physical-Chemical Process for Treatment of Raw and Combined Sewage Using Powdered, Activated Carbon," a paper presented at the 44th Annual Conference Water Poll. Control Fed., San Francisco, Calif. (October, 1971).

In Mode A, the acidified carbon/alum slurry was added to influent waster water in tank 14 without aeration to produce a pH of less than 4.0. The influent flow rate was constant at 4 liters per minute, giving a total retention time of about 80 minutes. A lime slurry was added to the waste water between tanks 14 and 26 to precipitate aluminum hydroxide by raising the pH to between 6.0 and 7.0. An anionic polyelectrolyte flocculant was injected into the water stream between tanks 26 and 32. Flocculation was promoted by slow mixing in tank 38. Sedimentation and filtration were accomplished in the tube settler 42 and multi-media filter 52. Sludge from the tube settler was pumped to stabilization tank 60. Regeneration of the sludge was not a subject of concern, so the 400 ml/min of sludge withdrawn from the tube settler was discarded.

Mode B operation is illustrated by FIG. 1 and was the same as Mode A, with the exception that an aerated biological culture was promoted in tank 26 by aeration of tank 26 and sludge recycle. Sludge from the tube settler 43 was pumped to stabilization tank 60, and aerated. The waste water influent flow rate to tank 14 was 2 liters per minute, giving a total retention time of 160 minutes. Sludge was withdrawn from the tube settler at 800 ml/min, with 200 ml/min discharged from the stabilization tank. Sludge was withdrawn from the stabilization tank at a rate of 600 ml/min and recycled to tank 26.

In Mode C operation, the carbon/alum slurry was acidified as with Mode B but then neutralized with lime while still in the chemical feed tank 32. The carbon-/alum slurry was added to tank 14 as were the recycled solids from the stablization tank 60. Tank 14 was aerated. Effluent from tank 14 was directed into the chemical mix tank 32, bypassing tank 26. The influent flow rate to tank 14 was 2 liters per minute. Sludge was withdrawn from the tube settler at 800 ml/min, with 600 ml/min recycled to tank 14 after stabilization and 200 ml/min discarded.

In Mode D, both tanks 14 and 26 were aerated. Biological solids from the stabilization tank 60 were recycled to tank 14 at the same flow rates as in Modes B and C. The acidified, neutralized carbon/alum slurry was added at the influent side of tank 26. Waste water influent flow rate to the system was 2 liters per minute.

Each of the modes was operated on a continuous basis while they were being studied. Influent and effluent samples were taken on an hourly basis and analyzed individually for TOC and turbidity A Beckman, Model 915, total organic carbon analyzer was used for all TOC measurements. A Hach, Model 2100, turbidimeter was used for turbidity measurements. All analytical procedures were in accordance with those found in "Standard Methods for the Examination of Water and Waste Water," 13th Edition, American Public Health Association, New York, N.Y. 874 pages (1971).

During all of the pilot plant studies, the alum does was constant at 200 mg/ml and the flocculant or polyelectrolyte dose constant at 2 mg/l. Influent flow rate was constant during each run and was held at 4 liters per minute of raw waste water in Mode A and 2 liters per minute of primary effluent in Modes B, C and D.

The graphs of FIGS. 2 and 3 are of TOC/ turbidity versus time of Mode A using only an acidified, powdered, activated carbon/alum slurry and Mode B using the same dosages of carbon alum and flocculant as in Mode A but coupling the powdered, activated carbon system with aerated biological treatment as described and claimed herein.

Table I is a summary of operational data obtained during this study for each mode of operation. The table shows average TOC, maximum TOC and minimum TOC concentrations for both influent and effluent streams for each mode of operation and carbon dose for 24-hour periods.

TABLE I
MAXIMUM, MINIMUM AND AVERAGE TOC DATA ON INFLUENT WASTEWATER AND PROCESS EFFLUENT AS A FUNCTION OF OPERATIONAL CONFIGURATION AND CARBON DOSE

| Mode | Stream | Carbon (mg/l) | Average TOC (mg/l) | Maximum TOC (mg/l) | Minimum TOC (mg/l) |
|---|---|---|---|---|---|
| A | Influent | 0 | 129 | 245 | 40 |
|   | Effluent | 0 | 41 | 63 | 13 |
| A | Influent | 100 | 111 | 318 | 19 |
|   | Effluent | 100 | 29 | 52 | 8 |
| A | Influent | 200 | 94 | 274 | 16 |
|   | Effluent | 200 | 23 | 36 | 5 |
| A | Influent | 300 | 85 | 177 | 20 |
|   | Effluent | 300 | 10 | 17 | 1 |
| A | Influent | 400 | 101 | 139 | 25 |
|   | Effluent | 400 | 26 | 38 | 9 |
| A | Influent | 600 | 56 | 150 | 12 |
|   | Effluent | 600 | 14 | 30 | 1 |
| A | Influent | 800 | 75 | 120 | 17 |
|   | Effluent | 800 | 13 | 25 | 5 |
| B | Influent | 600 | 72 | 164 | 40 |
|   |          | 600 | 59 | 95 | 29 |
|   |          | 600 | 51 | 77 | 40 |
|   |          | 600 | 46 | 68 | 26 |
|   | Effluent | 600 | 4 | 20 | 0 |
|   |          | 600 | 1 | 3 | 0 |
|   |          | 600 | 1 | 2 | 0 |
|   |          | 600 | 0 | 0 | 0 |
| B | Influent | 400 | 48 | 65 | 35 |
|   |          | 400 | 53 | 105 | 34 |
|   | Effluent | 400 | 5 | 8 | 2.5 |
|   |          | 400 | 4 | 9 | 2.5 |
| B | Influent | 200 | 46 | 78 | 34 |
|   |          | 200 | 57 | 92 | 40 |
|   | Effluent | 200 | 3 | 6.5 | 1 |
|   |          | 200 | 3 | 6 | 1 |
| B | Influent | 100 | 51 | 80 | 30 |
|   |          | 100 | 56 | 74 | 45 |
|   | Effluent | 100 | 10 | 20 | 6 |
|   |          | 100 | 9 | 14 | 3 |
| B | Influent | 2 | 50 | 88 | 25 |
|   |          | 2 | 50 | 78 | 15 |
|   | Effluent | 2 | 9 | 11 | 4 |
|   |          | 2 | 10 | 28 | 2 |
| C | Influent | 200 | 53 | 75 | 37 |
|   |          | 200 | 50 | 61 | 39 |
|   | Effluent | 200 | 14 | 23 | 6 |
|   |          | 200 | 10 | 18 | 4 |
| D | Influent | 200 | 77 | 134 | 34 |
|   |          | 200 | 63 | 77 | 51 |
|   | Effluent | 200 | 37 | 53 | 20 |
|   |          | 200 | 26 | 34 | 21 |

During Mode A, carbon doses of 0, 100, 200, 300, 400, 600 and 800 mg/l were employed. Mode A operation involved initial low pH contact between the carbon/alum slurry and the waste water followed by lime addition to precipitate aluminum hydroxide and then polyelectrolyte addition to promote flocculation. Following flocculation, the waste water was gravity clarified and then filtered.

Mode B studies were conducted with carbon doses of 2, 100, 200, 400 and 600 mg/l. Suspended solids analyses were run on samples from the aerated contact tank and sludge stabilization tank during Mode B operations at the 200 mg/l carbon dose. Mode B operation was the same as Mode A for the initial low pH contact followed by neutralization with lime prior to the second contact tank. However, the second contact tank was aerated to promote biological growth. The remainder of the system for the liquid stream treatment was the same as for Mode A. Unlike Mode A, however, the solids withdrawn from the sedimentation unit or tube settler during Mode B were aerated in the sludge stabilization tank and recycled to the second contact tank. Sludge was withdrawn from the tube settler at 800 ml/min with 600 ml/min recycled and 200 ml/min discharged.

In Modes C and D, the carbon dose was held at 200 mg/ml for both. Mode C operation involved use of only one contact tank which was aerated. The neutralized carbon/alum slurry, as well as the biological solids recycled from the stabilization tank, were all added to this tank. The remainder of this system was the same as Mode B operation. Mode D operation was similar to Mode B operation except the roles of the two contact tanks were reversed. Biological solids were recycled to the first contact tank, which was aerated. The neutralized carbon/alum slurry was added to the second contact tank, which was also aerated.

The data on effluent turbidity for operation in Modes A and B show that the process consistently produces an effluent of low turbidity (less than 2 JTU) independent of the influent turbidity values. This was not the case for Modes C and D, for reasons which will be explained. The data also indicate that effluent turbidity is essentially independent of carbon dose greater than 100 mg/l.

Organic removal (TOC data) from Mode A operation at 0 carbon dose produced an effluent varying from 15 to 50 mg/l TOC and was close to 40 mg/l TOC for most of the test. There was a steady improvement in process performance with increasing carbon dose, the 600 mg/l dose producing an effluent TOC ranging from 8 to 30 mg/l, with the majority of the samples being close to 20 mg/l. It is very clear from the data that an organic residual which is slowly sorbably or non-sorbable exists and that its concentration varies substantially. The 300 mg/l carbon dose effluent quality was slightly better while the 400 mg/l dose effluent was slightly worse than would be expected. The Mode A retention time was about 80 minutes, which does not represent an optimum value. Using regression anaylsis for the data obtained during runs in the Mode A configuration, the data clearly emphasize the process limits with respect to ultimate effluent TOC values. A constant effluent TOC between 15 and 20 mg/l appears to be the process limit for the waste water used. The Mode A configuration is capable of producing constant effluent TOC values of less than 10 to 15 mg/l for only very short periods.

Organic removal (TOC data) from Mode B operation at a carbon dose of 2 mg/l (essentially 0) produced an effluent TOC ranging from 2 to 28 mg/l, with most values close to 10 mg/l. This is in contrast to the mode A zero carbon dose effluent TOC range of 15 to 50 mg/l, with most values around 40 mg/l. The 600 mg/l carbon dose from Mode B produced an effluent TOC range of 0 to 20 mg/l, with most values between 9 and 3 mg/l. This is in contrast to Mode A operation at 600 mg/l carbon dose which produced an effluent TOC range of 1 to 30 mg/l, with most values between 10 and 20 mg/l.

While some of the difference in performance may be a result of using raw sewage in Mode A and primary effluent in Mode B, it is apparrent that the Mode B operation is a substantial improvement over Mode A, even considering the difference in raw sewage and primary effluent usage. In Mode B, the retention time was about 160 minutes, which, as in Mode A, does not ncessarily represent an optimum retention time. At all of the carbon doses, the process operated in Mode B configruation displayed excellent potential for producing nearly constant effluent quality.

The two other operational configuration, Modes C and D, also incorporated the combined powdered, activated carbon/biological treatment; however, neither mode proved to be particularly encouraging. Extensive testing conducted as a result of the poor performance of Modes C and D determined that there was some material in the raw waste water used which seriously interfered with alum clarification. This accounted for the poor performance of Modes C and D. The alum clarification in Modes C and D was found to be effective if calcium were added before aluminum hydroxide precipitation, as in Mode A. Alum apparently competes with the calcium since clarification is not effective if calcium is added at the same time as the alum. A complete explanation of the performance of Modes C and D is not possible without complete identification of the materials in the sewage which interfere with the coagulation process, and this was not done.

The data produced under the Mode B configuration represent a unique process configuration combining powdered, activated carbon and aerated biological treatment into a highly effective, short retention time process. The results indicate effluent TOC and turbidity quality comparable to the South Tahoe Public Utility Waste Water Reclamation Plant, one of the most advanced waste water treatment plants in existence in the United States today. The process claimed is capable of producing an effluent of zero TOC but which does contain COD in the range of 10 mg/l.

The embodiments of the invention in which a particular property or privilege is claimed are defined as follows:

1. An improved process for the removal and degradation of dissolved organic pollutants in waste water containing such using a combined powdered, activated carbon/aerated biological treatment process with relatively short retention time, comprising:
   1. contacting an influent waste water stream containing the organic pollutants in an aerated contact vessel with an oxygen-containing gas and a slurry containing an acidified mixture of powdered, activated carbon and alum for adsorption of organic pollutants in the waste water on the carbon and coagulation of the adsorbed carbon particles by the alum, the activated carbon and alum added in amounts to the influent waste water stream to give at least 50 mg/l carbon and 100 mg/l alum,
   2. adjusting to the pH of the treated influent waste water stream to cause precipitation of the alum as aluminum hydroxide,
   3. adding a polyelectrolyte flocculant to the treated influent waste water stream as an aid in effecting solid-liquid separation,
   4. effecting solid-liquid separation into sludge and a supernatant,
   5. aerating the sludge by discharge of an oxygen-containing gas therethrough for metabolism of the adsorbed organics therein,
   6. thermally regenerating a portion of the sludge to oxidize the organics absorbed on the carbon contained in the sludge for reactivation of the carbon and to convert aluminum hydroxide contained in the sludge to alumina,
   7. recycling a part of the aerated sludge to the aerated contact basin for contact with the influent waste water stream,
   8. acidifying another part of the thermally regenerated sludge with sulfuric acid to convert the alumina therein to alum, and
   9. recycling the acidified and thermally regenerated sludge portion containing reactivated carbon and alum for contact with the incoming influent waste water stream.

2. The process of claim 1 wherein lime is added to the water stream after addition of the carbon/alum slurry to raise the pH of the water being treated to cause precipitation of the alum as aluminum hydroxide.

3. The process of claim 1 wherein the acidified slurry of powdered, activated carbon and aluminum has a pH of about 4 or less.

4. The process of claim 1 including, after effecting solid-liquid separation, filtering the separated water stream.

5. An improved process for removal of insoluble and soluble organic materials from waste water containing the same, the process utilizing a combination of powdered, activated carbon and aerated biological treatment with relatively short retention time, comprising:
   1. contacting a waste water stream in an aerated contact vessel with an oxygen-containing gas and an acidified mixture of powdered, activated carbon and alum, added in amounts to the influent stream to give at least 50.0 mg carbon and 100 mg alum per liter of waste water for adsorption of organic materials in the waste water on the carbon and coagulation of the adsorbed carbon particles,
   2. adjusting the pH of the treated water to about 7.0, causing precipitation of alum as aluminum hydroxide,
   3. adding a polyelectrolyte flocculant to the treated water as an aid in effecting solid-liquid separation,
   4. effecting solid-liquid separation into sludge and a supernatant,
   5. discharging the supernatant as an effluent stream,
   6. aerating the sludge by discharge of an oxygen-containing gas therethrough to permit metabolism of adsorbed organics,
   7. thermally regenerating a part of the aerated sludge to oxidize the organic materials adsorbed in the carbon to reactivate the carbon contained therein, and to convert aluminum hydroxide contained therein to alumina,
   8. acidifying the thermally regenerated part of the sludge with sulfuric acid to convert the alumina therein to alum,
   9. recycling a portion of the aerated sludge for contact with the influent stream in the aerated contact vessel, and
   10. recycling the acidified and thermally regenerated sludge containing alum and activated carbon for contact with the incoming influent waste water stream.

6. The process of claim 5 including filtering the supernatant after solid-liquid separation and before discharge.

7. An improved process for the removal of insoluble and soluble organic pollutants from waste water containing the same, the process utilizing a combination of powdered, activated carbon and aerated biological treatment, comprising:

1. contacting the influent waste water containing the organic pollutants with an oxygen-containing gas and an acidified mixture of powdered, activated carbon and alum in an aerated contact vessel, the carbon and alum added in amounts to the influent stream to give at least 50 mg carbon and 100 mg alum per liter of waste water,
2. discharging the treated water into a second aerated vessel for contact with an oxygen-containing gas,
3. adjusting the pH of the treated water in the second contact vessel to about pH 7.0, causing precipitation of alum as aluminum hydroxide,
4. adding a polyelectrolyte flocculant to the treated water in an amount ranging from 0.5 to 5 mg flocculant per liter of waste water being treated,
5. effecting solid-liquid separation of the treated water into sludge and a supernatant,
6. discharging the supernatant as effluent,
7. aerating the sludge in an aeration vessel by discharge by an oxygen-containing gas therethrough for metabolism of organics adsorbed on the carbon,
8. recycling a portion of the aerated sludge to the first and second contact basins for contact with the influent stream being treated,
9. thermally regenerating another portion of the sludge to oxidize the organics adsorbed on the carbon, reactivate the carbon and convert aluminum hydroxide contained in the sludge to alumina,
10. acidifying the thermally regenerated portion of the sludge with sulfuric acid to convert alumina contained therein to alum, and
11. Recycling the acidifid reactivated carbon/alum mixture for contact and mixing with the influence waste water.

* * * * *